(12) United States Patent
Cole et al.

(10) Patent No.: US 7,793,774 B2
(45) Date of Patent: Sep. 14, 2010

(54) LOCKOUT AND MONITORING SYSTEM WITH SIL3 SAFETY RATING AND METHOD FOR LOCKOUT AND MONITORING

(75) Inventors: Simon M. Cole, Palm Beach (AU);
Philip G. Brown, Castle Hill (AU);
Roderick Gilmour, Woonona (AU)

(73) Assignee: Hubbell Incorporated, Shelton, CT (US)

( * ) Notice: Subject to any disclaimer, the term of this patent is extended or adjusted under 35 U.S.C. 154(b) by 197 days.

(21) Appl. No.: 12/219,844

(22) Filed: Jul. 29, 2008

(65) Prior Publication Data

US 2010/0030345 A1 Feb. 4, 2010

(51) Int. Cl.
*G05B 11/01* (2006.01)
*G05B 9/02* (2006.01)

(52) U.S. Cl. .............. 198/810.01; 198/502.1; 700/230; 700/21; 700/79

(58) Field of Classification Search .............. 198/502.1, 198/502.3, 502.4, 810.01, 810.02; 700/230, 700/20, 21, 79
See application file for complete search history.

(56) References Cited

U.S. PATENT DOCUMENTS

| | | | |
|---|---|---|---|
| 5,186,308 A | 2/1993 | Munro | |
| 6,705,454 B2 | 3/2004 | Fishaw et al. | |
| 7,050,860 B2 * | 5/2006 | Muneta et al. | 700/3 |
| 7,062,355 B2 | 6/2006 | Wielebski et al. | |
| 7,228,186 B2 * | 6/2007 | Karschnia et al. | 700/19 |
| 7,269,465 B2 | 9/2007 | Esch et al. | |
| 2001/0026750 A1 | 10/2001 | Suzuki | |
| 2004/0008467 A1 * | 1/2004 | Calandre et al. | 361/119 |
| 2004/0186615 A1 | 9/2004 | Wielebski et al. | |
| 2004/0210323 A1 * | 10/2004 | Muneta et al. | 700/21 |
| 2004/0237472 A1 | 12/2004 | De Cardenas et al. | |

(Continued)

FOREIGN PATENT DOCUMENTS

JP 2006/240866 A 9/2006

(Continued)

OTHER PUBLICATIONS

Longwalls ed Mar 2002 conveyor 2 wire transmission system, Two-wire system gains acceptance, Mar. 2002.

(Continued)

*Primary Examiner*—Mark A Deuble
(74) *Attorney, Agent, or Firm*—Stanislav Torgovitsky; Mark S. Bicks; Alfred N. Goodman

(57) ABSTRACT

Lockout and monitoring system with SIL3 safety rating and method for lockout and monitoring of conveyor or any distributed plant are provided where pulse width modulation and amplitude modulation are used for communication between field devices (such as remote isolation switches deployed at various locations of a conveyor belt) and a central controller, and for indication of the device location. A fail safe redundant switching system for control circuit with additional transmitter and receiver modules are provided in combination with the means for accurate indication of switch location to achieve SIL 3 rating. The ability to provide control (analogue and digital outputs) for a distributed plant, for example along the length of a conveyor, is advantageously achieved, particularly when the control outputs are line powered by means of a field bus system that provides both power and signaling on the same network.

20 Claims, 5 Drawing Sheets

U.S. PATENT DOCUMENTS

| | | |
|---|---|---|
| 2005/0113942 A1 | 5/2005 | Longsdorf et al. |
| 2005/0192704 A1 | 9/2005 | Wielebski et al. |
| 2006/0212161 A1* | 9/2006 | Bhat et al. .................. 700/197 |
| 2008/0097624 A1 | 4/2008 | Weatherhead et al. |

FOREIGN PATENT DOCUMENTS

| | | | |
|---|---|---|---|
| JP | 2007/137556 A | 6/2007 | |
| WO | WO 2006/136260 A | 12/2006 | |

OTHER PUBLICATIONS

Austdac Oak Grove Coal News, Editorial, Jun. 2006.
Australia's Mining Monthly, Editorial, Sep. 2005.
03-126-35-xx06-15_conveyor_monitoring_remote_isolation. indd, www.austdac.com.au, Austdac Pty, Ltd., Dec. 14, 2005 (Australia).
03-168-35-xx04-12_longwall_signalling_and_comms.indd, www.austdac.com.au, Austdac Pty, Ltd., Dec. 14, 2005 (Australia).
03-210-35-xx02-12_longwall_comms_and_signalling.indd, www.austdac.com.au, Austdac Pty, Ltd., Feb. 1, 2006 (Australia).
03-240-35-xx01-06_austdac_conveyor_control_system.indd, www.austdac.com.au, Austdac Pty, Ltd., Dec. 14, 2005 (Australia).
04-001-43-xx23-01_longwall_signalling_communication_system.ppt, www.austdac.com.au, Austdac Pty, Ltd., May 30, 2006 (Australia).

* cited by examiner

LOCKOUT AND MONITORING SYSTEM WITH SIL3 SAFETY RATING AND METHOD FOR LOCKOUT AND MONITORING

BACKGROUND OF THE INVENTION

1. Field of the Invention

The present invention is directed in general to conveyor systems or any distributed plant, and in particular to monitoring and safety devices associated with such systems.

2. Discussion of the Background

Conveyor lockout and monitoring systems are generally employed in mining and manufacturing operations for overland and underground conveyor belts.

In the operation of any conveyor installation, there is a need for a method of stopping the conveyor in an emergency situation and safely remote isolating the conveyor for maintenance purposes. Several methods exist today to accomplish the basic emergency stop and isolation functions but these have no location information. Existing systems include:

Simple series connection of mushroom or lanyard operated emergency stop switches to the conveyor motor control circuit. This type of system is subject to critical safety issues when simple electrical cable faults exist.

Series connection of mushroom or lanyard operated stop switches with an end of line device to improve safety issues in the presence of simple electrical cable faults.

These conventional systems suffer from the problems of not providing the name or number, and therefore the location, of the activated switch. Modern conveyors are typically exceeding 4,000 meters in underground installations and 10,000 meters in overland installations so the lack of information as to the location of the activated emergency stop switch or remote isolation switch can be costly in both lost time and loss of life.

Conventionally, conveyors have power available only at the drive points, typically at the head or tail ends of the conveyor. Power is not generally available along the entire length of the conveyor, particularly long overland conveyors through often difficult remote terrain. This lack of power makes location information providing monitoring systems even more difficult which is why most installations are limited to the simple series circuit system described above.

General conveyor operational parameters are also required to be monitored along the entire length of the installation, these include: belt wander, belt tear, belt slip and bearing temperatures, to name a few. These are often difficult to monitor given the distances involved and the lack of power.

Conveyor installations are by their nature hostile environments for any electrical equipment and cabling that may be installed on their superstructure. The equipment and particularly the cabling is subject to vibration, dust, falling material, rain, extremes in temperature and exposure to radiation all of which can result in the introduction of electrical faults that can compromise the integrity and safety of the conventional series connection monitoring systems described above.

Several U.S. patents and published U.S. patent applications in the field of conveyor monitoring describe such applications, and are discussed below as examples of conventional implementations.

U.S. Pat. No. 7,062,355 discloses a method of communicating information among components of a conveyor system where electrical communications architecture includes a central control device, multiple conveyor modules, and an address-based network. In particular, this patent is directed to communication architecture for conveyor systems modularly constructed of connected sections, each section having motorized roller assemblies and associated object sensors sensing objects on the section. The communication signals are provided based upon addresses embedded within the communication signals, the addresses being indicative of at least one of the central control device, the operational devices, the modules and zones associated with the conveyor modules. An address-based network is provided for coupling the central control device with each of the plurality of intermediate controllers, and for sending a plurality of commands from the central control device to the intermediate controllers by way of the address-based network.

U.S. Patent Applications Publication Nos. 2004/0186615 and 2005/0192704 disclose a control system with an additional feature of a logic system 84 that may be adapted to execute stored programs according to certain parameters and messages received from a master device to, for example, provide start/stop and speed control to the motorized rollers of conveyor sections. Each of these published applications is directed to specific implementations of such a logic system to facilitate a more flexible control of conveyor systems constructed of multiple independently-powered conveyor modules as described in the patent application that issued as U.S. Pat. No. 7,062,355.

U.S. Patent Application Publication No. 2008/0097624 discloses a system applicable to state processing in an industrial control environment that implements a system having module components to facilitate the processing. In particular, this published application discloses a system where propagation components are embedded within the module components to communicate state information to at least one other module component of the system. The communicated state information includes control information relating to reset, mode and faults, and the state propagation components are provided within a hierarchical architecture where the control information is communicated up or down the hierarchy of modules. Components associated with system 100 illustrated in this published patent application can include various components that propagate safety data up and down the hierarchy including presence sensing devices, safety switches, interlock switches, safety relays, emergency stop devices, cable pulls and enabling switches, safety controllers, and so forth which are capable of interacting to form a safety system. Safety Integrity Level (SIL) is noted as one of the functional safety aspects provided by a system implementing the propagation components that propagate the safety data.

U.S. Pat. No. 5,186,308 discloses a control system for industrial conveyor systems which include plural individual conveyor. In particular, an electrical control system for such a conveyor system comprises a main controller which is located at any selected location in a factory and sub-controllers each mounted on or located immediately adjacent the respective conveyors sections. The conveyor system includes at least two individual conveyors that interact with each other and must be operated in a timed relationship. Information from/to sub-controllers is transmitted via a dedicated communication line to the main controller in which signals are processed by a PC operating under the control of a diagnostic program.

U.S. Pat. No. 6,705,454 discloses a controller for an accumulating power roll conveyor system having a series of modular sections divided into multiple independently powered zones each zone having an actuator for driving the rollers of the zone and a part sensing member for detecting the presence of a part in the zone. The controller implements an analog (specifically, not digital) electrical circuit to facilitate precise physical stoppage for parts moving in each zone by controlling the part sensing members and the actuators.

U.S. Pat. No. 7,269,465 discloses a control system for controlling safety-critical processes that includes a field bus, a bus master for controlling communication via the field bus, a signal unit connected to the bus master via the field bus for linking to a safety-critical process and a control unit for controlling the safety-critical process. The background section of the specification generally describes a control and data transmission installation in which safety-related devices can communicate with one another via a field bus, and the safe control is affected using the field bus. An added feature disclosed in the U.S. Pat. No. 7,269,465 patent is implementation of a bus master to more effectively control communication with a plurality of signal units via the field bus.

U.S. Patent Application Publication No. 2008/0097624 relates to process devices used to monitor operation of an industrial process, and discloses an apparatus for use in a process device to provide a desired Safely Integrity Level (SIL) for the process device. According to this published patent application, process devices include control devices, such as conveyors, and process monitors which monitor operation of the process. In particular, a supervisory overlayer for use with or in a process device is disclosed. The supervisory overlayer monitors operation of the process device and is used to prevent, mitigate and/or detect failure of component(s) or other aspects of the device, including the supervisory overlayer itself.

None of the above-described patents or patent applications discloses a conveyor monitoring system where pulse width modulation and amplitude modulation are used for communication between field devices (such as remote isolation switches deployed at various locations of a conveyor belt) and a central controller, and for indication of the device location. Furthermore, none of these patents or patent applications discloses a fail safe redundant switching system for a conveyor control circuit where additional transmitter and receiver modules are provided in combination with the means for accurate indication of switch location to achieve SIL 3 rating.

The ability to provide control (analogue and digital outputs) along the length of the conveyor is also an advantage, particularly when the control outputs are line powered, that is provided by a field bus system that provides both power and signaling on the same network.

An example of a system available from Austdac Pty. Ltd. is illustrated in a block diagram of FIG. 1A and corresponding schematic of FIG. 1B where a conveyor control panel 100 connects to emergency stop switches 102, which can be impended as pullkeys, via a field bus 104. As shown in FIGS. 1A and 1B, the system includes selector switches 108 wired to operate a remote isolation function, and a tail end unit 106 that has end of line transmitters P1 and P2.

Other examples of systems available from Austdac Pty. Ltd. are described in published Austdac Pty. Ltd. documents numbers 03-126-35-xx06-15, 03-168-35-xx04-12, 03-210-35-xx02-12, 03-240-35-xx01-06 and 04-001-43-xx23-01, available for review at www.austdac.com.au. The entire contents of these published Austdac Pty. Ltd. documents are incorporated herein by reference. One of ordinary skill in the art would readily appreciate how systems such as those described in these published Austdac Pty. Ltd. documents can be configured to incorporate certain exemplary features of the embodiments of the present invention based on the teaching and disclosure set forth below in the DESCRIPTION OF THE EXEMPLARY EMBODIMENTS OF THE INVENTION.

By introducing a device at each emergency stop or lanyard switch that can indicate to the conveyor monitoring system that an emergency stop or lanyard switch has been activated and also provide an unique code to indicate which switch has been activated can therefore provide the location of the switch along the conveyor is able to solve many of the issues involved with conventional conveyor installations.

Location information also increases the integrity and therefore the safety of the system by allowing diagnostics to be carried out using location information to determine if cable open circuit faults or faults involving earth or conveyor structure have occurred. This information can be used to provide warnings or automatically shut down the conveyor.

SUMMARY OF THE INVENTION

The present invention provides, inter alia, conveyor lockout and monitoring systems and methods that combine switch identification (using, for example, pulse width modulation and amplitude modulation for communication) and fail safe redundant switching (using, for example, SIL3 rated modules).

According to certain exemplary embodiments of the present invention, system and method for conveyor lockout and monitoring comply with the international IEC 61508 standard requiring fail safe hardware and software and a Safety Integrity Level (SIL) of 3, with 4 being the highest. The system and method facilitate stopping of the conveyor in an emergency situation and safely remote-isolating the conveyor for maintenance purposes, as well as system identifying the location along the conveyor of an activated emergency switch to generate a specific warning and automatically shutdown the conveyor.

According to exemplary implementations of embodiments of the present invention, a safety concept of a signal line control system is implemented using a three-wire field bus system where both signaling and power are provided on the same network: pulse-width modulation for outbound communication and amplitude modulation for inbound communication.

According to yet other exemplary implementations of embodiments of the present invention, when a switch signaling an emergency stop is operated, a transmitter is turned ON and a separate transmitter is turned OFF resulting in a fail safe redundant switching system for the conveyor control circuit combined with accurate indication of the switch location.

According to exemplary implementations of embodiments of the present invention, a unique system with SIL 3 rating and method therefore provide not only fail safe stopping of the conveyor but also accurate indication of switch location that signaled the stopping.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings where.

DESCRIPTION OF THE EXEMPLARY EMBODIMENTS OF THE INVENTION

Figure 1A:
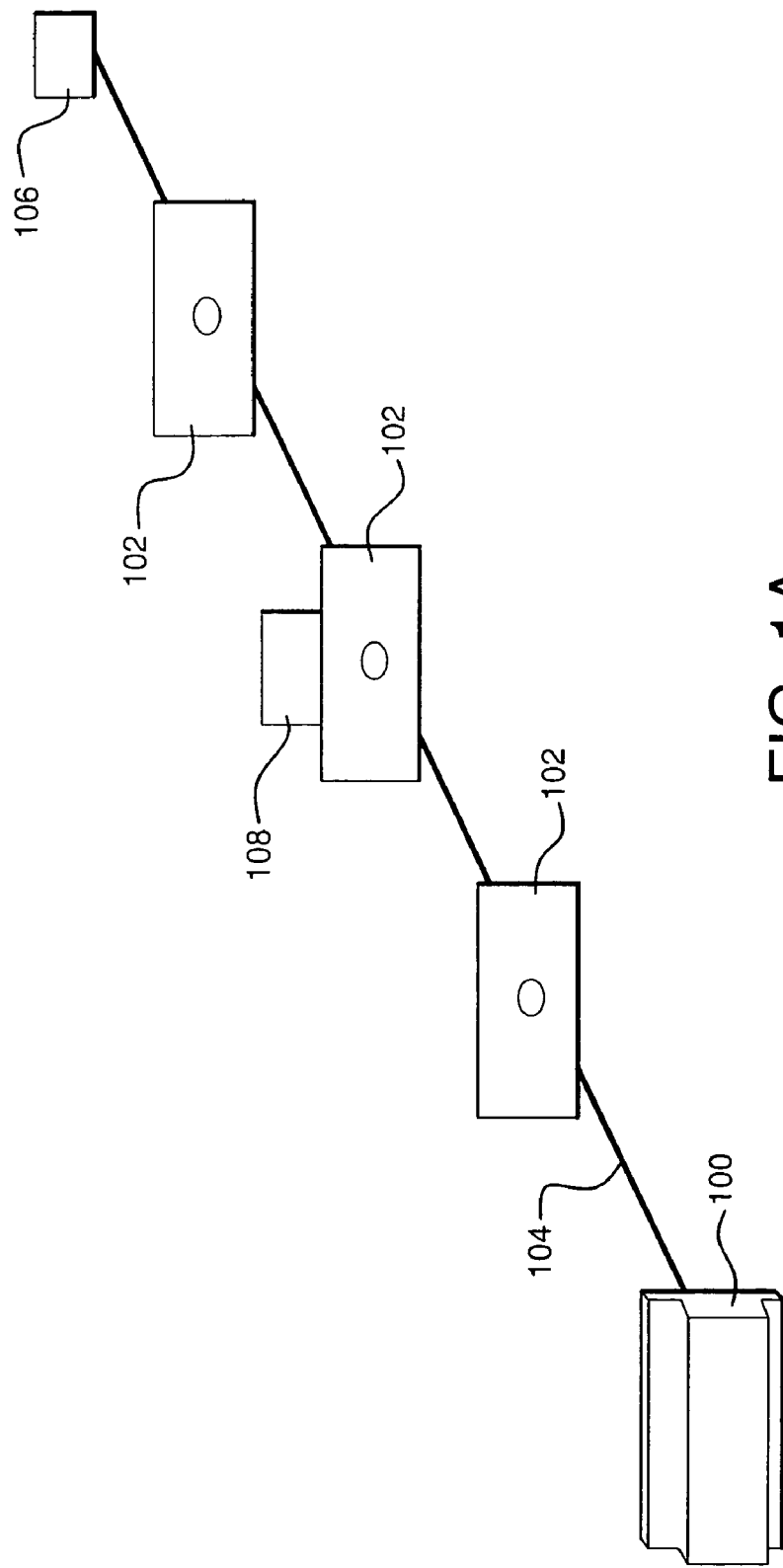
FIGS. 1A and 1B show an implementation a conventional conveyor monitoring system.
Figure 1B:
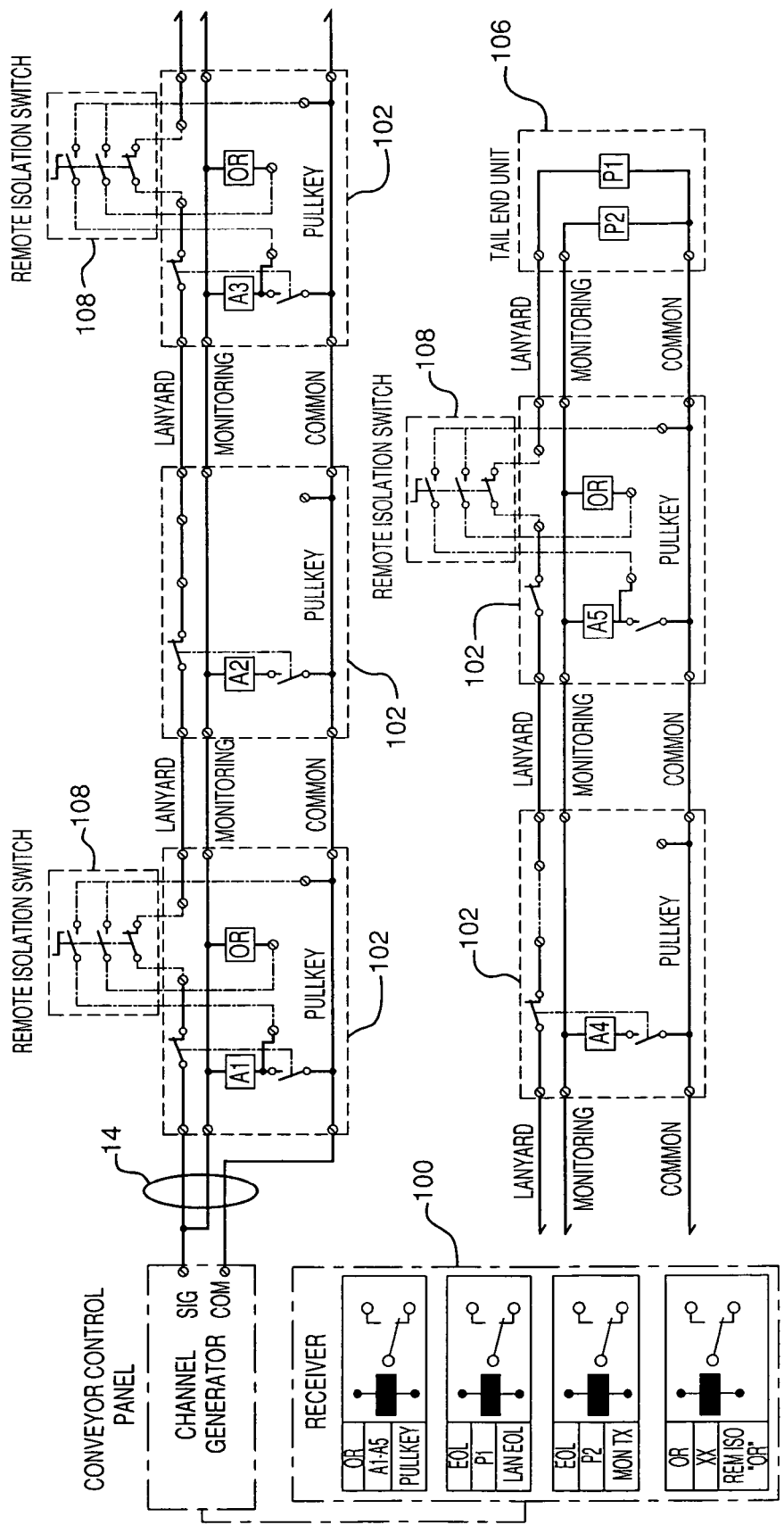

Referring now to the drawings, wherein like reference numerals designate identical or corresponding parts throughout the several views, exemplary embodiments of the present invention are shown in schematic detail.

Figure 2:
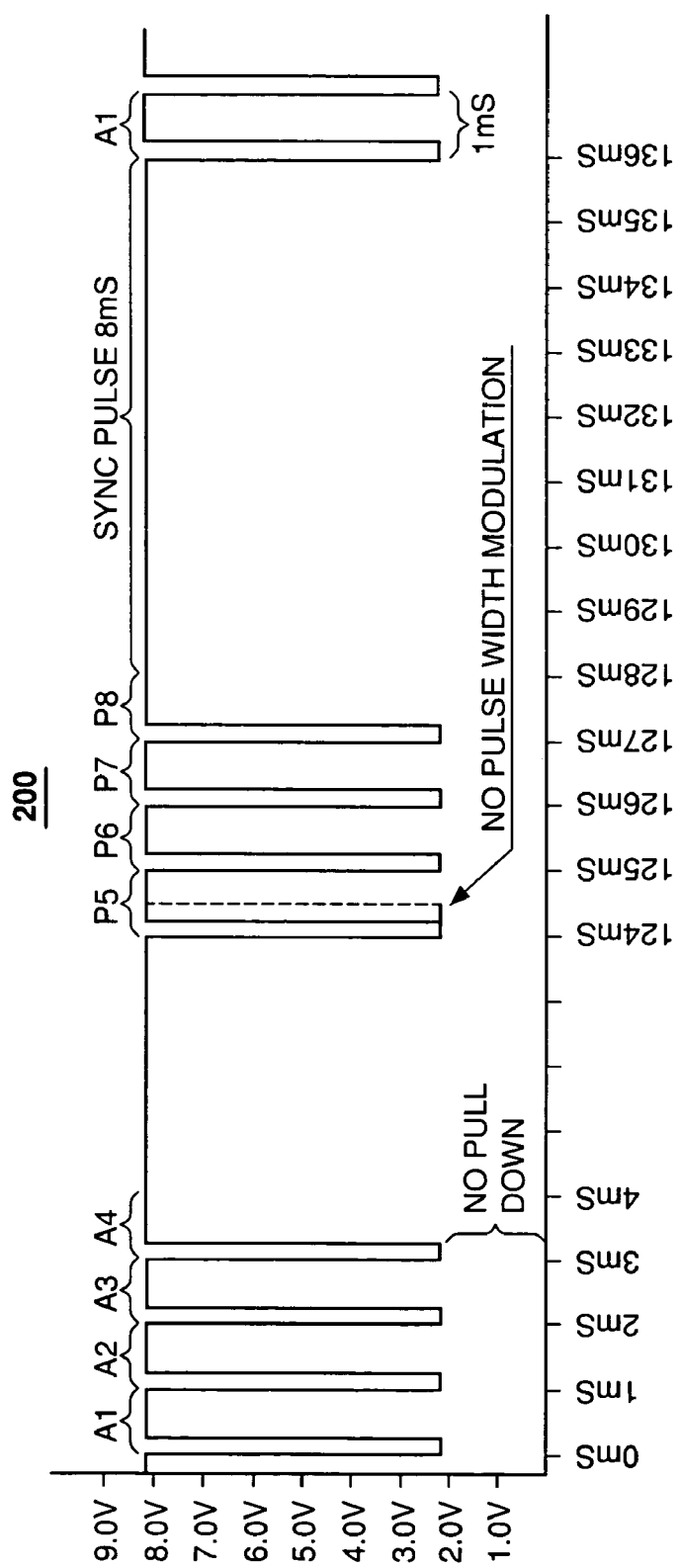
FIG. 2 shows an example of a communication pulse train for use in conveyor monitoring systems.
Figures 3A, 3B:
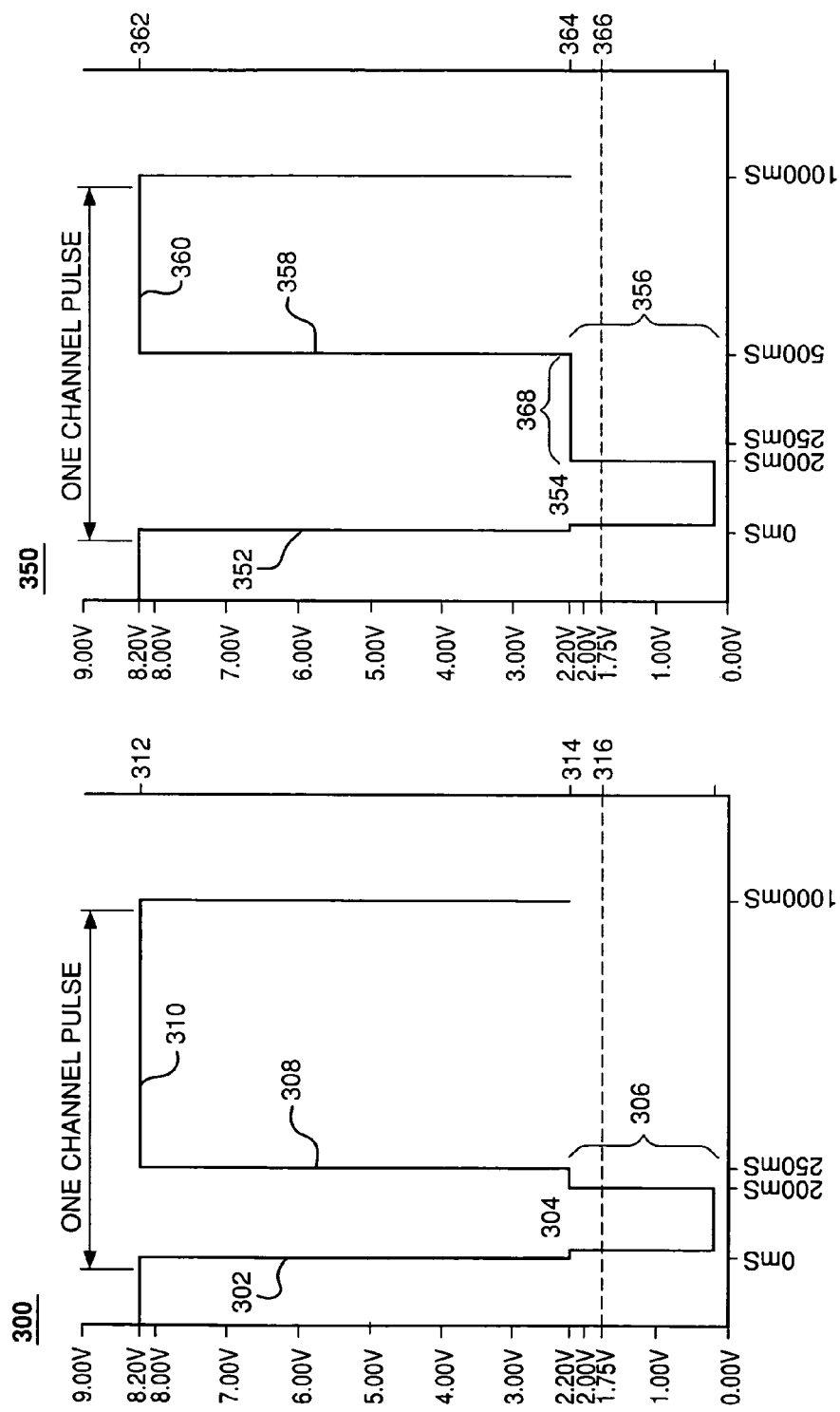
FIGS. 3A and 3B show examples of channel pulses for modulated communication.

Referring to FIGS. 2, 3A and 3B, an implementation of a field bus that provides power and signaling in systems and methods according to exemplary embodiments of the present invention, is illustrated with reference to plots of a pulse train and individual channel pulses for inbound and outbound communication.

In an exemplary implementation of the present invention, a conveyor monitoring system uses a two or three wire field bus system that provides both power and signaling on the same network. The system network is capable of extending to distances greater than 10,000 m with up to 128 transmission devices attached. The basis of data transmission along the field bus twisted pair or triplet network is that of pulse-width-modulation for outbound communications and amplitude modulation for inbound communications. The channel generator continuously maintains an offset square wave of 1 kHz frequency (that is, 1 ms period), each pulse representing one of the channels. The number of pulses and therefore the number of channels can be configured in a channel generator. The typical number of channels is 8, 16, 32, 64 or 128. In the following illustrative, non-limiting example, a system is configured for 128 channels.

Examples of the relationships between the number of channels, address range and total scan time is illustrated by the data presented in Table 1 below.

According to an exemplary implementation, communications on the field bus twisted pair is bi-directional using amplitude modulation for inbound signals from transmitters and pulse width modulation for outbound signals to receivers. In distributed I/O systems not all communications are from the field to the controller or vice versa, communications can be from field device to field device. According to embodiments of the present invention, an implementation of the field bus has a unique feature of coupling the inbound to the outbound communications allowing multiple receivers to sample or eavesdrop on the one transmitter device, thus providing true distributed I/O. The channel generator configured to sample the inbound amplitude modulation and essentially immediately alter the outbound pulse width modulation to reflect the state of the inbound channel achieves this coupling.

In some non-limiting applications of certain exemplary embodiments of the present invention, the inbound and outbound communication can be un-coupled and is referred to as split I/O. Split I/O greatly increases the number of channels available.

FIG. 2 shows an example of a typical field bus pulse train 200 with no transmitters transmitting and no active channels being transmitted by the channel generator to any field receivers. The two features of note in this waveform are: firstly, the absence of any amplitude modulation at the bottom of negative going pulses; and secondly, there is a constant space to mark ratio of 1:3, indicating no active output channels. A non-active outbound channel is represented by the low portion of the pulse being one unit or 250 uS wide and the high portion of the pulse being three units or 750 uS wide making up the total period for the pulse of 1 mS. A non-active inbound

| FIELD BUS SYSTEM SIZE, ADDRESS RANGE AND UPDATE TIMES | | | | | | | |
|---|---|---|---|---|---|---|---|
| Number of Channels | First Address | Last Address | Sync Pulse | Scan Time | Worst Case Update Time | | |
| | | | | | 1D | 2D | 3D |
| 8 | A1 | A8 | 8 mS | 16 mS | 32 mS | 48 mS | 64 mS |
| 16 | A1 | B8 | 8 mS | 24 mS | 48 mS | 72 mS | 96 mS |
| 32 | A1 | D8 | 8 mS | 40 mS | 80 mS | 120 mS | 160 mS |
| 64 | A1 | H8 | 8 mS | 72 mS | 144 mS | 216 mS | 288 mS |
| 128 | A1 | H8 | 8 mS | 136 mS | 272 mS | 408 mS | 544 mS |

According to an exemplary implementation, a channel generator emits the 128 channels regardless of whether or not the channels have been assigned to an I/O device. At the end of 128 pulses the channel generator sends an 8 ms wide pulse that resets all of the counters in the field devices back to zero, before the pulse train is repeated. The 8 mS wide pulse or synchronization pulse is used to ensure that all field devices are kept in synchronization ensuring that transmitters transmit on the correct channel and receivers sample the pulse train at the correct time. All field devices simply count the pulses or channels until the count matches their assigned address before transmitting or receiving.

The channels or addresses used in the field bus network in exemplary implementations of networks are labeled using a combination of alpha and numeric characters to make the assigning of addresses a little more easy and meaningful. For example, in a 128 channel system the first channel is assigned the address A1, the last P8. Each alpha character covers a range of eight channels thus: A1, A2, A3, A4, A5, A6, A7 and A8 followed by B1 to B8 and so on.

channel is shown by the bottom of the low section of the pulse not going below 2.2 volts. The synchronization pulse is also clearly visible at 8 mS wide.

FIG. 3A shows an example of an active inbound channel that has been amplitude modulated or "pulled down" by an active field transmitter. As shown in FIG. 3A, a channel pulse 300 of the pulse train includes: a falling edge 302; a low portion 304; amplitude modulation or pull down of transmitter portion 306; a rising edge 308; and a high portion 310. In the example of FIG. 3A, high level output of channel generator is indicated by reference numeral 312, low level output of channel generator is indicated by reference numeral 314, and pull down amplitude modulation detect voltage is indicated by reference numeral 316.

According to an exemplary implementation, for the pull down to be recognized by the channel generator it must go below 1.75 volts and occur within the first 200 uS of the low portion of the channel pulse. All transmitter and receivers advance their internal counter on the negative edge of a channel pulse to be ready, if required, to transmit or receive. A small delay sometimes occurs between the negative edge put by the channel generator and the final pull down by the active transmitter. The updating of the counter causes this delay. Note that the transmitter does not alter the mark space ratio of the channel pulse; the channel generator does this after detecting a valid "pull down".

Once a valid pull down has been detected, the channel generator will delay the rising edge of the channel pulse by an additional 250 uS, making the mark space ratio 1:1. It is this additional delay to the rising edge of the channel pulse that the appropriately coded receiver detects and acts upon.

FIG. 3B shows an example of a channel pulse that has been pulse width modulated in response to a valid pull down or transmission from an active transmitter. As shown in FIG. 3B, a pulse width modulated channel pulse includes: a falling edge 352; a low portion 354; amplitude modulation or pull down of transmitter portion 356; a rising edge 358; and a high portion 360. In the example of FIG. 3B, high level output of channel generator is indicated by reference numeral 362, low level output of channel generator is indicated by reference numeral 364, and pull down amplitude modulation detect voltage is indicated by reference numeral 366. An example of a channel pulse as illustrated in FIG. 3B also includes portion 368 indicative of pulse width modulation produced by a channel generator in response to valid amplitude modulation by the transmitter.

According to exemplary embodiments of the present invention, because the pulse train and modulation is present along the entire length of the field bus twisted pair network, the receivers can be placed at any convenient point to monitor a channel for local output. For example, many receivers can monitor the same channel or transmitter. This feature makes field bus implementation according to various embodiments of the present invention advantageous for "distributed" or "decentralized" I/O applications.

According to exemplary implementations, each of the field devices can derive power from the field bus network by pump charging a capacitor reservoir that can supply power to the field device during the low period of the field bus network pulse train.

Exemplary embodiments of the present invention provide a fail safe method of remotely isolating and locking out the control voltage to drive motors on machines. In accordance with certain exemplary implementations, system design can, upon an emergency stop request, isolate conveyor motor drives in a fail safe manner, and give accurate information of switch location. In yet another exemplary implementation, a fail safe method of remotely isolating drive motors over long distances can be added to the functionality of the system.

One of the drawbacks of conventional systems addressed by certain embodiments of the present invention that provide for remote isolation is that under conventional isolation procedures before any work could be done on a conveyor the power to the conveyor drive motors had to be isolated, the drive motor plug removed or a visual break breaker used, the breaker had to be locked and tagged by all personnel working on the conveyor. This conventional process is extremely time consuming and excessive periods of down time on the system were imminent causing large loss of production.

According to an exemplary embodiment of the present invention, a safety concept of a signal line control system is based on a 3 wire system where when a switch has been operated a transmitter is turned ON and a separate transmitter is turned OFF giving a fail safe redundant switching system for the conveyor control circuit combined with accurate indication of switch location.

Yet another exemplary implementation provides modules that have been assessed and tested by international testing authorities to the latest world standards for safety devices to IEC61508 standard and achieved a SIL3 rating which means that the system according to embodiments of the present invention is unique in providing not only fail safe stopping on the machine but also accurate indication of switch location. An added ability to monitor and control analogue devices on a SIL rated system ensures the flexibility of the system and method according to embodiments of the present invention for monitoring and control functions.

According to exemplary embodiments of the present invention, end users are provided with flexible reliable methods of motor isolation with control and monitoring functionality.

Figure 4:
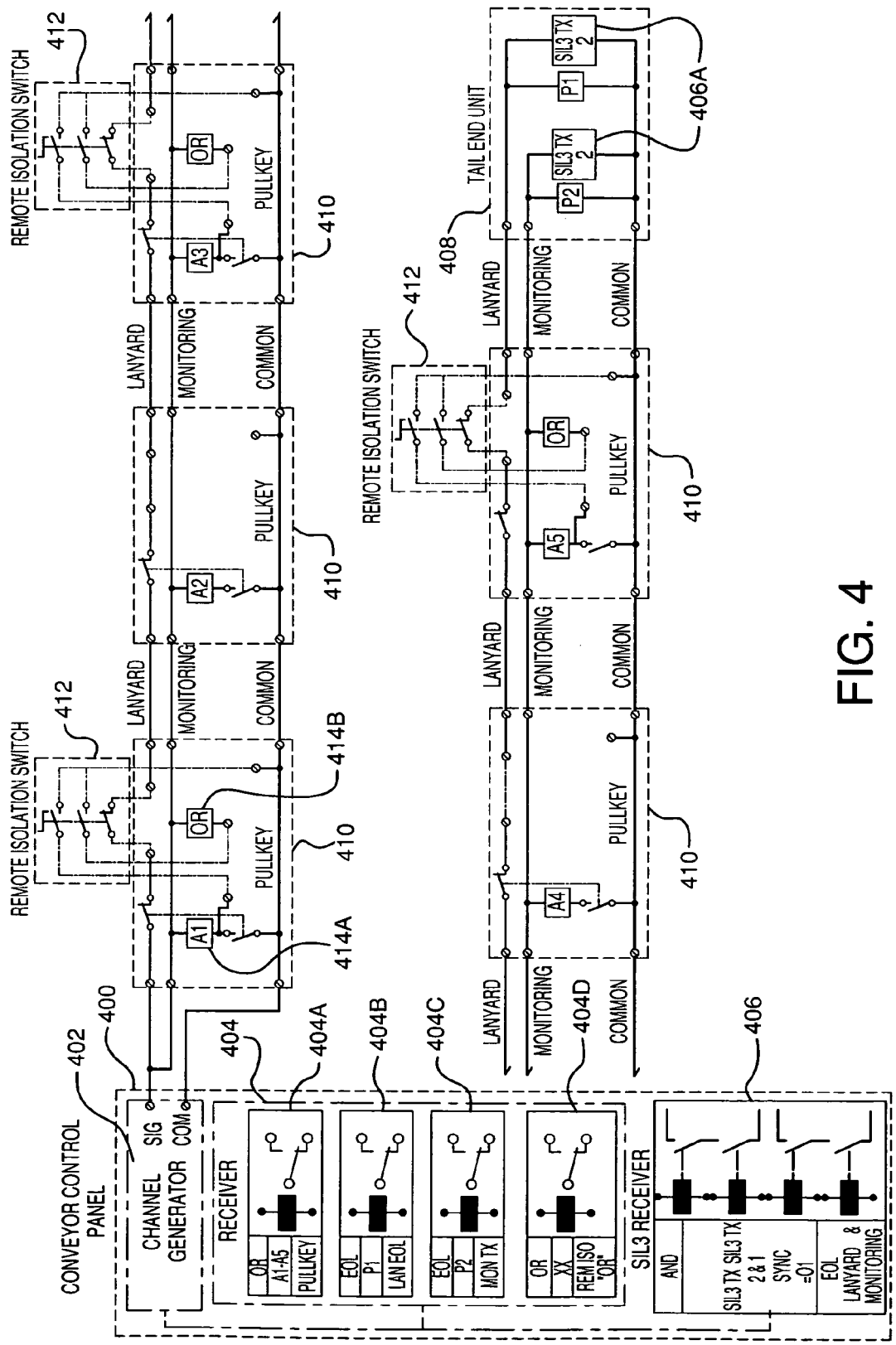
FIG. 4 shows an example of an implementation of a conveyor lockout and monitoring system according to an embodiment of the present invention.

An exemplary implementation of a SIL3 rated systems according to certain embodiments of the present invention is illustrated in a schematic diagram of FIG. 4. Referring to FIG. 4, exemplary system includes a controller 400 which incorporates a channel generator/Master Controller 402 and a four channel relay receiver 404 connected to the transmission system. One controller unit per system provides the transmission system for transmitting data from the field devices to the relay control receivers. Each relay can be individually coded to respond to individual or several transmitters in the field.

Channel relay receiver 404 is configured to include: a relay 404A coded to change state when an emergency stop or lanyard switch is activated (placed in stop position) or when a remote isolation is selected and turns on transmitter in the field switch enclosure; a relay 404B coded to change state when an emergency stop or lanyard switch is activated (placed in stop position) or when a remote isolation selected and the transmitter coded P1 at the end of the system is disconnected from the transmission system; a relay 404C coded to change state if the cable is open circuited and the transmitter coded P2 at the end of the system is disconnected from the transmission system; and a relay 404D coded to change state when the remote isolation function is selected.

In the example of FIG. 4, the system includes a safety relay receiver 406 certified to SIL level 3 and category 4 of international safety standards. Receiver 406 facilitates state changes in a fail safe manner when any switch or remote isolation switch is operated and the safety transmitters at the end of the system are disconnected from the transmission system. Safety transmitters 406A located at the end of the system turned off when any emergency stop or lanyard switch or remote isolation switch is turned operated.

The non-limiting configuration of a system according to exemplary embodiments of the present invention, as illustrated in FIG. 4 further includes: a tail end unit 408 enclosure housing the safety transmitters 406A and end of line transmitters P2 and P1; emergency stop switches 410 operated when emergency stop function is required; selector switches 416 wired into circuit to operate the remote isolation function; field transmitters 414A operated when emergency stop switch is operated, trips relay 404A when turned on, and also gives location identification of the switch being operated; and field transmitter 414B operated when remote isolation function selected trips relay 404D when turned on, and also gives location identification where remote isolation has been requested.

While exemplary embodiments and implementations of the present invention have been described, numerous additional modifications and variations of the present invention are possible in light of the above teachings. It is therefore to be understood that within the scope of the appended claims, the present invention may be practiced otherwise than as specifically described herein.

We claim:

1. A system comprising:
    a field bus communication system;
    a plurality of field devices connected to the field bus communication system;
    a relay control receiver connected to the field bus communication system;
    a controller for transmitting data from the field devices to the relay control receiver;
    a safety transmitter configured at an end of the field bus communication system; and
    a safety relay receiver configured to facilitate state changes in the relay control receiver according to communication received from any one of the plurality of the field devices.

2. The system according to claim 1, wherein the field devices comprise at least one of a switch and a remote isolation switch, and the safety transmitter is configured to turn off when any of the at least one of the switch and remote isolation switch is turned off.

3. The system according to claim 1, wherein the field bus communication system is configured to support pulse modulation.

4. The system as claimed in claim 1, wherein the field bus communication comprises inbound communication where signaling includes pulse amplitude modulation.

5. The system as claimed in claim 1, wherein the field bus communication comprises outbound communication where signaling includes pulse width modulation.

6. The system as claimed in claim 1, wherein the data from the field devices comprises unique identification of each of the plurality of the field devices.

7. The system as claimed in claim 6, wherein transmission from at least one of the plurality of the field devices facilitates remote isolation of the at least one of the plurality of the field devices and signals notification of the location of the at least one of the plurality of the field devices.

8. The system as claimed in claim 1, wherein the field bus communication system is configured to provide power and signaling for at least some components on the field bus communication system.

9. The system as claimed in claim 1, further comprising at conveyor, wherein at least one of the plurality of the field devices comprises an emergency stop switch and/or remote isolation switch configured along the conveyor.

10. The system as claimed in claim 9, wherein the safety relay receiver is further configured to facilitate lockout of the conveyor according to communication received from any one of the plurality of the field devices.

11. The system as claimed in claim 9, wherein the controller is further configured to identify location of an operated one of the emergency stop switch and/or remote isolation switch based on the data transmitted from the field devices to the relay control receiver.

12. The system as claimed in claim 9, further comprising at least one state monitoring device configured along the conveyor, wherein the controller is further configured for transmitting data from the at least one state monitoring device to the relay control receiver to facilitate monitoring of a state of the conveyor.

13. The system as claimed in claim 12, wherein the at least one state monitoring device is configured to monitor at least one of belt wander, belt tear, belt slip and bearing temperatures of the conveyor.

14. A method for system monitoring and lockout, the method comprising:
    connecting a plurality of field devices to a field bus communication system;
    connecting a relay control receiver to the field bus communication system;
    transmitting data from the field devices to the relay control receiver;
    configuring a safety transmitter at an end of the field bus communication system; and
    facilitating a state changes in the relay control receiver according to communication received from any one of the plurality of the field devices.

15. The method as claimed in claim 14, wherein the field devices comprise at least one of a switch and a remote isolation switch, the method further comprising turning off the safety transmitter when any of the at least one of the switch and remote isolation switch is turned off.

16. The method as claimed in claim 14, further comprising assigning a unique identification to each of the plurality of the field devices, wherein the data from the field devices comprises the unique identification of each of the plurality of the field devices.

17. The method as claimed in claim 16, further comprising:
    remote isolating the at least one of the plurality of the field devices based on the data from the at least one of the plurality of the field devices; and
    providing a notification of the location of the at least one of the plurality of the field devices based on the data from the field devices.

18. The method as claimed in claim 14, further comprising configuring at least one of the plurality of the field devices in a conveyor system, wherein the at least one of the plurality of the field devices comprises an emergency stop switch and/or remote isolation switch configured along the conveyor.

19. The method as claimed in claim 18, further comprising configuring the safety relay receiver to facilitate lockout of the conveyor according to communication received from any one of the plurality of the field devices.

20. The method as claimed in claim 18, further comprising identifying location of an operated one of the emergency stop switch and/or remote isolation switch based on the data transmitted from the field devices to the relay control receiver.

* * * * *